Patented Oct. 14, 1930

1,778,707

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

PROCESS OF TREATING RUBBER AND PRODUCT OBTAINED THEREBY

No Drawing. Original application filed March 2, 1928, Serial No. 258,670. Divided and this application filed March 2, 1928. Serial No. 258,675.

This invention relates to the treatment of rubber and similar materials and to the products obtained thereby. The invention is more particularly concerned with new classes of chemical compounds capable of functioning as accelerators of vulcanization.

This case is a division of copending application Serial No. 258,670, filed of even date.

Accordingly the objects of the invention include the vulcantization of rubber treated with the hereinafter described classes of compounds. Another object is to provide new chemical compounds, particularly useful in vulcanization, which are comparatively inexpensive and at the same time highly efficient both from the standpoint of their behavior during the compounding of rubber as well as in the properties which they impart to the vulcanized product. Another object of the invention is to accelerate the action of the new chemical compounds by the addition of base or to retard their action by the addition of acid material. A further object of the invention is to provide a method whereby the acid or base or the new compounds themselves may be introduced in rubber.

In the present practice of the use of accelerators, it is generally known that many of the compounds employed are so powerful that they cause a prevulcanization, or burning on the mixing mill. This serious disadvantage is possessed by many of the accelerators which have the property of vulcanizing rubber at ordinary temperatures or at temperatures well below those ordinarily employed in hot vulcanization, for example at 212° F. or thereabouts. Illustrations of such rapid accelerators are metallic dithiocarbamates, metallic salts of other thioacids, mercapto thiazoles and the like. According to the present invention this serious objection of prevulcanization may be entirely overcome, the rubber compounds may be mixed upon the mill with practically no danger of prevulcanization thereon, without sacrificing the accelerating power which is desired. Certain of the compounds forming the subject matter of the present invention may be mixed with rubber with entire safety on the mixing mills, subject to the conditions hereinafter named, whereas others may be safely mixed, observing certain precautions as to mill temperature, etc.

The invention includes combining rubber and similar vulcanizable materials with a vulcanizing combination including a vulcanizing agent, a metallic oxide or its equivalent and a poly nitro phenyl thiol derivative of a substituted dithio-carbamate, and vulcanizing the rubber. The invention also includes the products thus obtained, and also the preparation of the chemicals themselves.

The invention further consists in accelerating the action of the compounds by the addition of basic materials and in retarding the action of the compounds and particularly the burning of the compounds by the addition of acid material. The invention further consists in introducing basic materials or acid materials or the compounds herein disclosed by diffusion from rubber or from any surrounding medium.

The following are representative constitutional formulæ of the compounds:

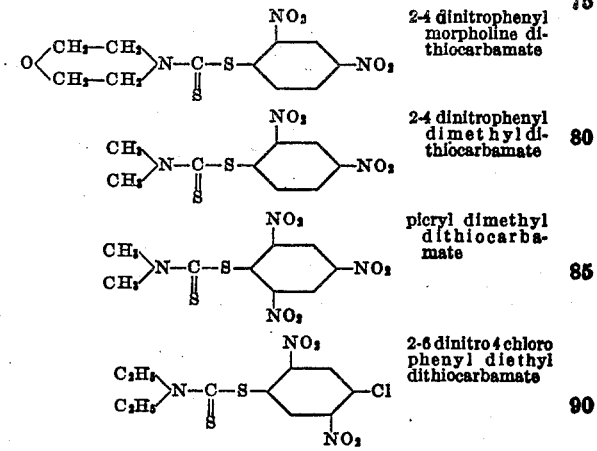

As illustrations of groups comprising Y, in which Y is a carbon atom in a substituted polynitro phenyl group, the following may be given: 2,4 dinitrophenyl, 2,6 dinitro-4-chlorophenyl picryl.

It will be observed that there is at least one nitro group ortho to the 1-position, and that at least one of the remaining substituents is meta to the aforesaid nitro group. In the dinitro phenyl groups, the two nitro groups are meta to each other, and at least one of them is ortho to the 1-position. The compounds may be represented as $$\underset{X}{\overset{RCSY,}{\|}}$$

where R and X are N and S respectively, and Y is a carbon atom in a group attached at the S of $$\underset{X}{\overset{RCS-,}{\|}}$$

is not doubly bonded to sulphur or oxygen, and in this case, forms part of a polynitrophenyl substitution. The compounds comprise, more specifically $$\underset{S}{\overset{NCSY,}{\|}}$$

and are polynitro phenyl thiol derivatives of substituted dithiocarbamates.

The whole compound such as 2,4 dinitrophenyl dimethyl dithiocarbamate reacts at least as rapidly with sodium hydroxide in boiling aqueous alcohol as diphenylmethyl dimethyl dithiocarbamate reacts under the same conditions. All the compounds which react with sodium hydroxide at least as rapidly as diphenylmethyl dimethyl dithiocarbamate (M. P. 96.5–97° C.), accelerate vulcanization, in the presence of a metallic oxide, such as zinc oxide or an equivalent metallic compound.

Zinc oxide is a good illustration of a metallic oxide which may be used. In place of zinc the following elements may be used in any combined form preferably somewhat basic and soluble in rubber mercury preferably in the mercuric state, lead preferably in the plumbous state, cadmium, copper preferably in the cupric state, arsenic preferably in the arsenous state, manganese preferably in the manganous state. Preferably the metallic compound is of such a nature that the metallic element is available during the vulcanization process. Oxides, stearates, carbonates are among the metallic compounds which may be used.

As one illustration of the invention employing the 2,4 dinitrophenyl dimethyl dithiocarbamate, the following is given:—100 parts of pale crepe, 10 parts of zinc oxide, 3 parts of sulphur, and 0.25 part of the 2,4 dinitrophenyldimethyldithiocarbamate may be mixed together in the customary way on the mixing rolls or in any other desired way. The rubber stock thus prepared is well vulcanized in 30 minutes at 40 pounds steam pressure. With .25 part of the carbamate a well cured stock may be obtained in 30 minutes at 30 pounds steam pressure or in 60 minutes at 20 pounds. Good results may be obtained at temperatures corresponding to steam pressures varying from 10 pounds to 40 pounds or above, by making proper adjustment in the quantity of accelerator employed. The above mentioned compound is particularly well suited for use in highly compounded stocks, will give non-blooming products with a short cure, or at the lower temperatures of the hot vulcanizing range. This carbamate may be used to advantage in shoe upper stocks, since it functions well in air cures. It works well with reclaimed rubbers and low grade rubbers. If this stock be prepared on a mixing mill it will be found that the tendency towards prevulcanization on the mill is less than would be observed with the corresponding thiuram monosulphide prepared from a dimethyl dithiocarbamate.

The 2-4 dinitrophenyldimethyldithiocarbamate may be prepared as follows:

196 pounds of 23% dimethylamine solution (or an equivalent amount of approximately the same strength) is treated with 80 pounds of carbon disulphide in a closed system provided with a means of cooling the reaction mixture. 160 pounds of 25% sodium hydroxide is added using the same closed system and cooling. Good agitation is desirable for these operations. The solution is filtered from the excess carbon disulphide or other extraneous matter and constitutes an aqueous solution of sodium dimethyl dithiocarbamate. 202 pounds of 2,4 dinitro chlor benzol is dissolved by adding 1188 pounds of denatured alcohol (82% by weight) at about 104° F. The solution of the sodium salt of dimethyl dithiocarbamate is run into the alcoholic solution of dinitrochlorbenzol in the course of about 45 minutes. During the addition the temperature of the reaction mixture should be maintained at about 104° F. and the mixture should be well agitated. The stirring is continued for about an hour at this same temperature. The mixture is then cooled to room temperature and filtered. The residue is washed with water and dried at 150° F. The material should melt at 135 to 140° C.

As another embodiment one may mix 100 parts of pale crepe, 10 parts of zinc oxide, 3 parts of sulphur and .4 part of 2,4 dinitrophenyl di-isopropyl dithiocarbamate on the mill in the usual manner. This stock may be vulcanized for 60 minutes under 40 pounds steam pressure.

As an example of a stock which may be vulcanized in air according to the usual method employed in the vulcanization of black footwear, one may mix 40 parts of pale crepe, 5 parts of iron oxide, .81 part of sulphur, 25 parts of lamp black, 3 parts of carbon black, 4 parts of zinc oxide and 22 parts of barytes with .5 part of 2,4 dinitrophenyl dimethyl dithiocarbamate. This stock vulcanized well in the ordinary air cure.

The compounds disclosed herein function well when the cure is carried out according to any of the commercial methods such as in steam, talc, water, etc.

I have observed that the action of the compounds disclosed herein is accelerated by the presence of a small amount of a basic material such as sodium hydroxide, trisodium phosphate, dicyandiamide, piperidine, aniline, dibenzylamine, piperazine, hydrate, triethanolamine. The action of the basic substances is particularly marked in the case of the polynitrophenyl compounds such as 2,4 dinitrophenyl dimethyl dithiocarbamate. The use of the base lowers the temperature at which the accelerator functions or increases its speed of functioning and usually increases the tensile strength at all temperatures of vulcanization by about 10%. For instance a stock made up of 100 parts of pale crepe, 10 parts of zinc oxide, 3 parts of sulphur and .25 part of 2,4 dinitrophenyl dimethyl dithiocarbamate gave in one instance a tensile of 1235 pounds per square inch after 60 minutes at 5 pounds steam pressure and 2980 pounds after 60 minutes at 40 pounds steam pressure. In one instance, .07 part of sodium hydroxide was added and the tensile after 60 minutes at 5 pounds steam pressure was 3465 pounds and after 60 minutes at 40 pounds steam pressure the tensile was 3365 pounds. When one part of sodium hydroxide was added to the stock it cured at ordinary temperatures in less than a week and gave a tensile of 4935 pounds after 60 minutes at 5 pounds steam pressure. .15 part of piperidine was added instead of the sodium hydroxide and the stock gave a tensile of 4740 pounds after 60 minutes at 10 pounds steam pressure, 5550 pounds after 60 minutes at 20 pounds steam pressure and 4300 pounds after 60 minutes at 40 pounds steam pressure.

The effect of the base on these dinitrophenyl compounds is much more marked than it is upon other accelerators such as tetramethylthiuram monosulphide, diphenylguanidine, acetaldehyde aniline condensation product or heptaldehyde aniline condensation product.

Since a basic substance accelerates the action of the accelerator and lowers the temperature at which it functions, it also increases the speed of burning on the mixing mill. Therefore the greater the amount of base present in the mix, the greater the danger of burning on the mixing mill and rubbers which are alkaline therefore accelerate the action of these compounds. Burning on the mixing mill is one form of what is herein called premature vulcanization. The latter expression also includes the burning, scorching, or setting up of the stock on mills, calenders, tubing machine, as well as any prevulcanization which may occur or be incipient prior to the actual deliberate vulcanization operation. This is particularly true of the polynitrophenyl compounds.

On the other hand the addition of acid retards the action of the accelerator and therefore improves its resistance to burning. Here again the action is particuularly marked in the case of the polynitrophenyl compounds. For instance .1 part of monochlor acetic acid added to the stock given above so effects the action of the accelerator that after 60 minutes at 5 pounds steam pressure, no cure was obtained and after 60 minutes at 40 pounds steam pressure the tensile was 2380 pounds. If .5 part of monochlor acetic acid were used no cure was obtained even after 60 minutes at 40 pounds steam pressure. Other acids which I have successfully employed are sulphanilic, oxalic, picric, phosphoric, trichloracetic, para toluene sulphonyl chloride and pine tar. I have also successfully employed substance which may form acids during the course of vulcanization such as ethyl oxalate or zinc acetate.

Since the presence of acid retards the action of compounds disclosed herein and particularly the action of the polynitrophenyl compounds, the addition of an appropriate amount of acid serves to increase the resistance to burning as much as may be desired. Mixes which are slightly acid because of the presence of carbon black or pine tar resist burning on the mill abnormally well. The vulcanization of rubbers which are acid by nature, or contain appreciable amounts of acid or acidic ingredients, is not accelerated so well by the herein described compounds, unless the acidic property be first removed or neutralized.

Likewise, rubbers or rubber stocks which are appreciably basic by nature, or contain basic materials, may display a marked, often undesirable tendency towards prevulcanization. Such basic rubbers or stocks may be treated with acidic material to remove, to curb, or to control this tendency to prevulcanize. Therefore, by the use of basic material and acidic material in suitable proportions as required, any rubber or stock may be brought to a predetermined speed of vulcanization.

Instead of adding on the mixing roll the basic materials intended to activate the compounds or accelerate their action, one may permit the basic material to diffuse into the rubber. For instance if the stock given above for vulcanization in the air be vulcanized in air containing ammonia, the vulcanization is greatly accelerated and the surface of the stock is remarkably hard and resistant to marring. The introduction of the basic material may be made on the mill by diffusion from a liquid, solution, or gas, or from adjoining rubber stock or from a fabric.

As another example, I make the compounds in the usual manner consisting of 100 parts of pale crepe, 10 parts of zinc oxide, 3 parts of sulphur and 2 parts of 2-4 dinitrophenyl dimethyl dithiocarbamate. This stock in the form of a sheet .060" thick or in the form of an article may be treated with gaseous ammonia for 16 hours. Thereafter it will vulcanize at 212° F. much more rapidly than a stock not so treated. Instead of gaseous ammonia, I may employ aqueous ammonia, aqueous diethylamine, aqueous aniline or dimethylamine or aniline vapor. It is believed that these basic materials diffuse into the rubber and accelerate the action of the dinitrophenyl dimethyl dithiocarbamate.

The action of the bases is most marked with the dinitrophenyl compounds.

As an example of the introduction by diffusion of the basic material as well as the introduction by diffusion of some of the compounds disclosed herein, the following illustration is given: 100 parts of pale crepe, 10 parts of zinc oxide, 3 parts of sulphur, 1 part of 2,4 dinitrophenyl dimethyl dithiocarbamate and .2 part of monochlor acetic acid are mixed to form one stock which is calendered to a thickness of .010". Another stock is made up of 100 parts of pale crepe, 10 parts of zinc oxide, 3 parts of sulphur and 4 parts of dibenzylamine. This stock is mixed on the mills in the usual manner and calendered to a thickness of .010". The two stocks are plied up alternately using 3 plies of each and allowed to stand for 24 hours to permit the diffusion of the dibenzylamine into the dinitrophenyl stock and of the dinitrophenyl dimethyl dithiocarbamate into the dibenzylamine stock. Thereafter the plied up stock is heated at 212° and it is found that vulcanization occurs much more quickly than it does for the individual stocks which have not been plied up. It will be observed that the dibenzylamine acts to neutralize the monochlor acetic acid as well as to activate the dinithrophenyl dimethyl dithiocarbamate.

As pointed out before the presence of the monochlor acetic acid improves the resistance to burning but the procedure may be carried out without the use of the acid.

Other compounds disclosed herein may be substituted for the compounds given above. The basic material (ammonia, etc.) may be introduced from the surrounding medium such as air or water to neutralize the acid and/or to activate the accelerator. For instance if .2 part of acid be added to the stock for air cure given above, and the stock be cured in air containing ammonia gas the ammonia will not only neutralize the acid but will activate the dinitrophenyl compound. The basic material may be introduced in any desired manner at any time prior to complete vulcanization, i. e. it may be introduced during vulcanization as a gas or vapor, or it may be applied to the stock by painting, dipping, etc. before the stock is subjected to vulcanization, or the stock may be vulcanized in a solution or suspension of the basic material.

Any of these ingredients, base, acid, and accelerator may be brought together in the form of cements, i. e. a cement containing accelerator may be mixed with a cement containing the base at the time the cement is to be used. The accelerator cement will not vulcanize appreciably at ordinary temperatures if the base be absent. Likewise, an accelerator-containing cement may be preserved in an unvulcanized condition for a long period by the addition of acid (as such, in solution, or in a cement). When vulcanization is desired, a base may be added (as such, in solution, or in a cement) and vulcanization will then take place.

It is believed that the dinitrophenyl compounds are particularly susceptible to the action of acids and alkalies because the dinitrophenyl compounds of all sorts of acids such as dimethyl dithiocarbamic acid or hydrochloric acid do not hydrolyze readily in acid solution but do hydrolyze in the presence of an alkali solution or a base.

Other compounds which may be employed according to the process disclosed are:

2,4 dinitrophenyl diethyl dithiocarbamate (M. P. 81° C.).

2,4 dinitrophenyl dinormal-propyl dithiocarbamate (M. P. 84° C.).

2,4 dinitrophenyl di-isobutyl dithiocarbamate (M. P. 85° C.).

2,4 dinitrophenyl dinormal-butyl dithiocarbamate.

2,4 dinitrophenyl di-iso amyl dithiocarbamate (M. P. 52-54° C.).

2,4 dinitrophenyl dibenzyl dithiocarbamate (M. P. 106° C.).

2,4 dinitrophenyl morpholine dithiocarbamate (M. P. 125-130° C.).

(2,4 dinitrophenyl oxy-di-ethylene dithiocarbamate).

2,4 dinitrophenyl dicyclohexyl dithiocarbamate (M. P. 127° C.).

2,6 dinitro-4-chlorophenyl diethyl dithiocarbamate (M. P. 123° C.).

It will be noted that in these compounds, the nitrogen atom holds at least one aliphatic or alkyl group and is preferably disubstituted. These compounds may also be regarded as thiol esters, the substitution being on the S and are prepared in accordance with general procedure indicated herein, that is, reacting a solution of a salt (preferably the sodium salt) of a substituted dithiocarbamic acid with a solution of the chloride of the ester group—illustrated by 2,4 dinitrochlor benzol.

All of the above compounds are new chemicals, not recorded in the literature. The preparation of these materials forms the subject matter of separate applications.

All of the above mentioned compounds are accelerators of vulcanization. Some of them give high tensile strength and other valuable physical properties such as improved resistance to abrasion, ageing, and other properties. The claims are therefore to be broadly interpreted as including such treatment of rubber in any form (solid, solution, dispersion) for these purposes as well as for vulcanization, in which latter instance, it is understood that a vulcanizing agent and a metallic oxide or its equivalent will be added to the rubber and an antioxidant or other material improving the physical properites of the rubber may be present if desired. It is of course understood that not all of these compounds are of equal accelerating strength, pound for pound, under identical vulcanizing conditions. These accelerators may be used in conjunction with any of the known antioxidants, age improvers, and other materials introduced into rubber to improve ageing and other physical properties.

The compounds in general may be used in amounts varying between $\frac{1}{10}$ and 2 parts on 100 parts of rubber, depending of course on the type of stock, etc.

It is believed that, in general, as the molecular weight of the groups attached to the nitrogen is increased the higher is the vulcanizing temperature, when equi-molecular amounts of accelerators are considered, and the more resistant are the compounds to prevulcanization on the mixing mills, and the better is their action with litharge in the absence or presence of zinc oxide. The rate of reaction of the compound with sodium hydroxide in boiling aqueous alcohol may be determined as follows:

.00125 mols of the compound is weighed into a 50 c. c. Erlenmeyer; 25 c. c. 95% alcohol and .0015 mols sodium hydroxide in the form of an approximately normal solution are added and the solution brought to the boiling point as quickly as possible and kept there for exactly 30 minutes. The solution is then cooled quickly and titrated with approximately N/10 acid, using phenolphthalein as the indicator. Carbon dioxide-free water should be used throughout. A blank should be run in order to check up on the amount of acid necessary to neutralize the sodium hydroxide when no compound is used. The decrease in hydroxyl ion content during the boiling is taken as a measure of the extent of the reaction with sodium hydroxide.

The above procedure constitutes a method whereby the relative rate of hydrolysis of any given compound of the types disclosed may be compared with that of diphenylmethyl dimethyl dithiocarbamate.

The diphenylmethyl dimethyl dithiocarbamate may be prepared in accordance with the general procedure indicated herein for the related esters of dithiocarbamates, that is, reacting in dilute alcoholic solution under heat the sodium salt,—sodium dimethyl dithiocarbamate—and the chloride of the ester group,—diphenyl chloro methane. The separated oil solidifies on standing and may be purified by recrystallization from alcohol in the usual manner.

It is known that the rate of hydrolysis of organic compounds, or more exactly, their rate of reaction with a base such as sodium hydroxide, varies with the substituents in the organic compound. This variation has been utilized in the present invention.

Having thus described my invention, what I claim and desire to protect by Letters Patent is:

1. A rubber product derived from rubber combined with a metallic oxide, a vulcanizing agent and a poly nitro phenyl ester of a substituted dithiocarbamic acid, which ester is capable of hydrolyzing in aqueous alcohol in the presence of sodium hydroxide at least as rapidly as diphenyl methyl dimethyl dithiocarbamate under the same conditions.

2. A rubber product derived from rubber combined with a metallic oxide, a vulcanizing agent and a poly nitro phenyl ester of a disubstituted dithiocarbamic acid, which ester is capable of hydrolyzing in aqueous alcohol in the presence of sodium hydroxide at least as rapidly as diphenylmethyl dimethyl dithiocarbamate under the same conditions.

3. A vulcanized rubber product derived from rubber combined with a metallic oxide, a vulcanizing agent and a poly nitro phenyl ester of an aliphatic-substituted dithiocarbamic acid, which ester is capable of hydrolyzing in aqueous alcohol in the presence of sodium hydroxide at least as rapidly as diphenyl methyl dimethyl dithiocarbamate under the same conditions.

4. A vulcanized rubber product derived from rubber combined with zinc oxide, sulphur and a poly nitro phenyl dialkyl dithiocarbamate which is capable of hydrolyzing in aqueous alcohol in the presence of sodium hydroxide at least as rapidly as diphenylmethyl dimethyl dithiocarbamate under the same conditions.

5. A vulcanized rubber product derived from rubber combined with zinc oxide, a vulcanizing agent and a dinitro phenyl ester of a substituted dithiocarbamic acid, which ester is capable of hydrolyzing in aqueous alcohol in the presence of sodium hydroxide at least as rapidly as diphenyl methyl dimethyl dithiocarbamate under the same conditions.

6. A vulcanized rubber product derived from rubber combined with zinc oxide, a vulcanizing agent and a dinitrophenyl ester of a disubstituted dithiocarbamic acid, which ester is capable of hydrolyzing in aqueous alcohol containing sodium hydroxide at least as rapidly as diphenyl methyl dimethyl dithiocarbamate under the same conditions.

7. A vulcanized rubber product derived from rubber combined with zinc oxide, sulphur and a dinitrophenyl compound of dialkyl dithiocarbamate, which compound is capable of hydrolyzing in aqueous alcohol containing sodium hydroxide at least as rapidly as diphenyl methyl dimethyl dithiocarbamate under the same conditions.

8. A rubber product derived from rubber combined with a metallic oxide, a vulcanizing agent and a 2-4 dinitrophenyl alkyl dithiocarbamate.

9. A vulcanized rubber product derived from rubber combined with zinc oxide, sulphur and a 2-4 dinitrophenyl disubstituted dithiocarbamate.

10. A vulcanized rubber product derived from rubber combined with zinc oxide, sulphur and a 2-4 dinitrophenyl aliphatic substituted dithiocarbamate.

11. A vulcanized rubber product derived from rubber combined with zinc oxide, sulphur and a 2-4 dinitrophenyl dialkyl dithiocarbamate.

12. A vulcanized rubber product derived from rubber combined with zinc oxide, sulphur and a 2-4 dinitrophenyl alkyl dithiocarbamate.

13. A vulcanized rubber product derived from rubber combined with zinc oxide, sulphur and a 2-4 dinitrophenyl dimethyl dithiocarbamate.

14. A method of treating rubber which comprises vulcanizing rubber containing zinc oxide and sulphur in the presence of a poly nitro phenyl ester of a substituted dithio carbamic acid which ester is capable of hydrolizing in aqueous alcohol in the presence of sodium hydroxide at least as rapidly as diphenyl methyl dimethyl dithiocarbamate under the same conditions.

15. A method of treating rubber which comprises vulcanizing rubber containing zinc oxide and sulphur in the presence of a poly nitrophenyl ester of a disubstituted dithiocarbamic acid, which ester is capable of hydrolizing in aqueous alcohol containing sodium hydroxide at least as rapidly as diphenyl methyl dimethyl dithiocarbamate under the same conditions.

16. A method of treating rubber which comprises vulcanizing rubber containing zinc oxide and sulphur in the presence of a poly nitrophenyl ester of an alkyl dithio carbamic acid, which ester is capable of hydrolyzing in aqueous alcohol containing sodium hydroxide at least as rapidly as diphenyl methyl dimethyl dithiocarbamate under the same conditions.

17. A method of treating rubber which comprises vulcanizing rubber containing zinc oxide and sulphur in the presence of a poly nitrophenyl dialkyl dithiocarbamate which is capable of hydrolizing in aqueous alcohol containing sodium hydroxide at least as rapidly as diphenyl methyl dimethyl dithiocarbamate under the same conditions.

18. A method of treating rubber which comprises vulcanizing rubber containing zinc oxide and sulphur in the presence of a dinitrophenyl ester of a substituted dithiocarbamic acid, which ester is capable of hydrolizing in aqueous alcohol containing sodium hydroxide at least as rapidly as diphenyl methyl dimethyl dithiocarbamate under the same conditions.

19. A method of treating rubber which comprises vulcanizing rubber containing zinc oxide and sulphur in the presence of a dinitrophenyl compound of a disubstituted dithiocarbamate which compound is capable of hydrolyzing in aqueous alcohol containing sodium hydroxide at least as rapidly as diphenyl methyl dimethyl dithiocarbamate under the same conditions.

20. A method of treating rubber which comprises vulcanizing rubber containing zinc oxide and sulphur in the presence of a dinitrophenyl dialkyl dithiocarbamate which is capable of hydrolizing in aqueous alcohol containing sodium hydroxide at least as rapidly as diphenyl methyl dimethyl dithiocarbamate under the same conditions.

21. A method of treating rubber which comprises vulcanizing rubber containing zinc oxide and sulphur in the presence of a 2-4 dinitrophenyl aliphatic-substituted dithiocarbamate.

22. A method of treating rubber which comprises vulcanizing rubber containing zinc oxide and sulphur in the presence of a 2-4 dinitrophenyl disubstituted dithiocarbamate.

23. A method of treating rubber which comprises vulcanizing rubber containing zinc oxide and sulphur in the presence of a 2-4 dinitrophenyl alkyl dithiocarbamate.

24. A method of treating rubber which comprises vulcanizing rubber containing zinc oxide and sulphur in the presence of a 2-4 dinitrophenyl dialkyl dithiocarbamate.

25. A method of treating rubber which comprises vulcanizing rubber containing zinc oxide and sulphur in the presence of 2-4 dinitrophenyl dimethyl dithiocarbamate.

Signed at New York, New York, this 23rd day of February, 1928.

SIDNEY M. CADWELL.

Certificate of Correction

Patent No. 1,778,707. Granted October 14, 1930, to

SIDNEY M. CADWELL.

It is hereby certified that error appears in the printed specification of the above-numbered patent requiring correction as follows: Page 1, strike out the last formula, lines 88 to 92, and insert instead

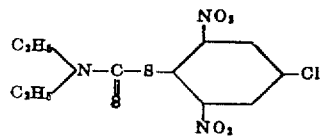

Page 4, line 90, strike out the word "solution"; and that the said Letters Patent should be read with these corrections therein that the same may conform to the record of the case in the Patent Office.

Signed and sealed this 26th day of January, A. D. 1932.

[SEAL.]

M. J. MOORE,
*Acting Commissioner of Patents.*